(12) United States Patent
Devarapalli et al.

(10) Patent No.: US 8,619,701 B2
(45) Date of Patent: Dec. 31, 2013

(54) METHOD OF FACILITATING HANDOFF FOR CDMA NETWORKS USING IP PROTOCOLS

(75) Inventors: Vijay Devarapalli, Santa Clara, CA (US); Rajeev Koodli, Sunnyvale, CA (US); Basavaraj Patil, Coppell, TX (US)

(73) Assignee: Core Wireless Licensing S.a.r.l., Luxembourg (LU)

( * ) Notice: Subject to any disclaimer, the term of this patent is extended or adjusted under 35 U.S.C. 154(b) by 743 days.

(21) Appl. No.: 10/920,444

(22) Filed: Aug. 18, 2004

(65) Prior Publication Data

US 2005/0243770 A1 Nov. 3, 2005

Related U.S. Application Data

(60) Provisional application No. 60/566,919, filed on May 3, 2004.

(51) Int. Cl.
*H04W 4/00* (2009.01)

(52) U.S. Cl.
USPC .............. 370/331; 370/352; 370/389

(58) Field of Classification Search
USPC ........... 370/331, 338, 329, 352; 455/436, 439
See application file for complete search history.

(56) References Cited

U.S. PATENT DOCUMENTS

| | | | | |
|---|---|---|---|---|
| 5,867,666 A | | 2/1999 | Harvey | 709/239 |
| 6,708,031 B2 * | | 3/2004 | Purnadi et al. | 455/436 |
| 6,766,168 B1 * | | 7/2004 | Lim | 455/435.1 |
| 6,785,256 B2 * | | 8/2004 | O'Neill | 370/338 |
| 6,832,087 B2 * | | 12/2004 | Gwon et al. | 455/436 |
| 6,973,088 B2 * | | 12/2005 | Kuzhiyil et al. | 370/395.2 |
| 6,978,128 B1 * | | 12/2005 | Raman et al. | 455/414.1 |
| 6,980,534 B1 * | | 12/2005 | Nee et al. | 370/329 |
| 7,079,511 B2 * | | 7/2006 | Abrol et al. | 370/331 |
| 7,154,868 B1 * | | 12/2006 | Sharma et al. | 370/331 |
| 7,184,418 B1 * | | 2/2007 | Baba et al. | 370/331 |
| 7,206,579 B2 * | | 4/2007 | Gwon et al. | 455/436 |
| 7,230,936 B2 * | | 6/2007 | Parekh et al. | 370/328 |
| 7,441,043 B1 * | | 10/2008 | Henry et al. | 709/238 |
| 7,535,870 B2 * | | 5/2009 | Nikander et al. | 370/331 |
| 7,535,872 B2 * | | 5/2009 | Jee et al. | 370/331 |
| 2003/0016655 A1 * | | 1/2003 | Gwon | 370/352 |
| 2003/0092444 A1 | | 5/2003 | Sengodan et al. | 455/436 |

(Continued)

FOREIGN PATENT DOCUMENTS

CA 2 359 040 A1 3/2002 ............ 370/331

OTHER PUBLICATIONS

Dommety et al., "Fast Handovers for Mobile IPv6", Jul. 2001, IETF, downloaded as <draft-ietf-mobileip-fast-mipv6-03.txt> on Aug. 27, 2007 from http://tools.ietf.org/wg/mobileip/draft-ietf-mobileip-fast-mipv6, posted Nov. 21, 2001.*

(Continued)

*Primary Examiner* — Brian O'Connor

(57) ABSTRACT

A method of configuring routers facilitates handoff of user equipment from a router to another router. The method includes configuring a virtual interface in a current router used by user equipment. The method also includes assigning a global address to the virtual interface. The global address is assigned to the virtual interface that is used to facilitate handoff of the user equipment from a current router to a new router. A system, router and user equipment are configured to implement the method.

30 Claims, 3 Drawing Sheets

(56) References Cited

U.S. PATENT DOCUMENTS

| | | | |
|---|---|---|---|
| 2003/0104814 A1* | 6/2003 | Gwon et al. | 455/436 |
| 2003/0125027 A1* | 7/2003 | Gwon et al. | 455/436 |
| 2005/0090277 A1* | 4/2005 | Islam et al. | 455/525 |

OTHER PUBLICATIONS

Johnson, D., "*Mobility Support in IPv6*", IETF Mobile IP Working Group, XP015002681, Jun. 30, 2003, pp. 1-172.

\* cited by examiner

METHOD OF FACILITATING HANDOFF FOR CDMA NETWORKS USING IP PROTOCOLS

REFERENCE TO RELATED APPLICATIONS

This application claims priority of U.S. Provisional Patent Application Ser. No. 60/566,919, filed on May 3, 2004, which is hereby incorporated by reference.

FIELD OF THE INVENTION

The present invention relates to a method of facilitating handoff.

BACKGROUND OF THE INVENTION

A communication system is a facility that enables communication between two or more entities such as user terminal equipment and/or network entities and other nodes associated with a communication system. The communication may comprise, for example, communication of voice, electronic mail (e-mail), text messages, data, multimedia and so on.

The communication may be provided by a fixed line and/or a wireless communication interface. A feature of wireless communication systems is that they provide mobility for the users thereof. An example of communication systems providing wireless communication are public land mobile networks (PLMN). An example of the fixed line system is a public switched telephone network (PSTN).

A communication system typically operates in accordance with a given standard or specification which sets out what the various elements of a system are permitted to do and how that should be achieved. For example, the standard or specification may define if the user, or more precisely user equipment, is provided with a circuit switched server or a packet switched server or both. Communication protocols and/or parameters which should be used for the connection are also typically defined. For example, the manner in which the communication should be implemented between the user equipment and the elements of the communication networks is typically based on a predefined communication protocol. In other words, a specific set of "rules" on which the communication can be based needs to be defined to enable the user equipment to communicate via the communication system.

So called third generation communication systems are being introduced. These so called third generation systems use code division multiple access techniques. One example of such a third generation communication system is the cdma2000 system.

When a mobile node (MN) moves and changes its point of attachment to the Internet, there is a period of time when it is not able to send packets because of the link switching delay and IP configuration procedures. Reference is made to the document "Fast Handovers for Mobile IP (Internet Protocol) v6—A Draft IETF (Internet Engineering Task Force) Specification (draft-ietf-mipshop-fast-mipv6-01.txt)". As discussed in this document, fast handoffs for IPv6 enable a mobile node to minimise this handoff latency by moving operations such as router discovery, IP address configuration and signalling the correspondent nodes to update its location out of the critical period when the mobile node is handing off. The proposed procedure discussed in this document for the fast handoff protocol involves setting up temporary forwarding for the traffic meant for the mobile node from the previous router to the new access router. To set up this forwarding, the mobile node needs to know the IPv6 global address of the previous access router so that it can send a fast binding update message to the previous access router.

In cdma2000 networks, when the mobile node requests a simple IPv6 service, it configures a topologically correct IPv6 address from the IPv6 prefix advertised by the PDSN (Packet Data Serving Node). If the mobile node moves and attaches to a different PDSN there is a period of time when the mobile node is not able to receive packets. The IPv6 address is configured during the IPv6CP:IPv6 Control Protocol phase of the PPP (Point-to-Point Protocol) set up between the mobile node the PDSN. However, in the CDMA 2000 networks, the PDSN only configures a link local address on the PPP link and does not configure a global address from the prefix advertised on the PPP link. The mobile node only knows the link local address of the PDSN. A link local address is one which is valid only on a link. In other words, a different link can have a different link address. A unicast global address has a global routing prefix which is a (typically hierarchically-structured) value assigned to a site (a cluster of subnets/links), a subnet ID identifying a link within the site and an interface ID. This is discussed in IETF document RFC 3513. Thus a link local address is valid only on a link whereas a global unicast address is globally routable.

Even if the PDSN were to configure a global address from the prefix advertised on the PPP link and inform the mobile node of the global address, it would still not be possible for the mobile node to send a fast binding update to the old PDSN from the new PDSN, if the mobile node hands off to a new PDSN. This is because the PPP link between the mobile node and the old PDSN is terminated when the mobile node moves to a new link and the PDSN's global address is no longer valid.

It is an aim of embodiments of the present invention to address or at least mitigate the above described problem.

SUMMARY OF THE INVENTION

According to a first aspect there is provided a method of configuring a router for facilitating handoff comprising the steps of:

configuring a virtual interface in a current router used by user equipment; and assigning a global address to said interface.

According to a second aspect, there is provided a system comprising a current router and user equipment, said current router being configured to have a virtual interface and having a global address assigned to said interface, said global address assigned to said interface being used to facilitate handoff of the user equipment from said current router to a new router.

According to a third aspect, there is provided a router configurable to have a virtual interface and having a global address assigned to said interface, said global address assigned to said interface being used to facilitate handoff of user equipment from said router to a new router.

According to a fourth aspect, there is provided user equipment arranged to communicate with a current router, said router being configured to have a virtual interface and having a global address assigned to said interface, said global address assigned to said interface being used to facilitate handoff of the user equipment from said current router to a new router, said user equipment being arranged to receive information on said global address from said current router.

BRIEF DESCRIPTION OF DRAWINGS

For a better understanding of the present invention as to how the same may be carried into effect, reference will now be made by way of example only to the accompanying drawings in which.

DETAILED DESCRIPTION OF PREFERRED EMBODIMENTS OF THE PRESENT INVENTION

Figure 1:
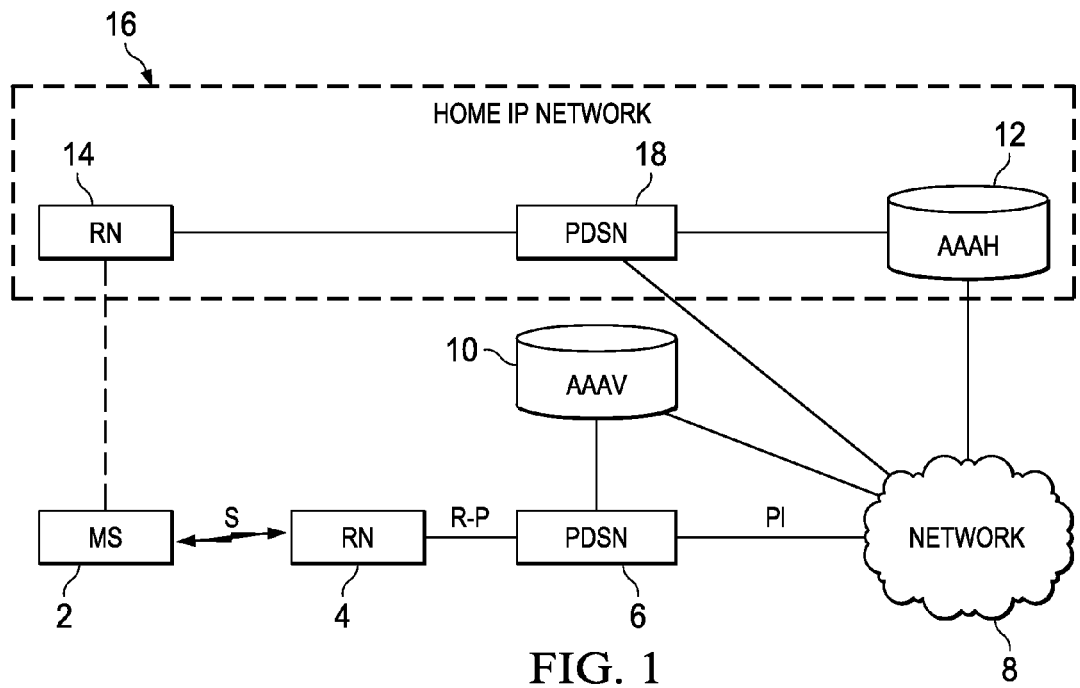
FIG. 1 shows a network in which embodiments of the present invention can be implemented.

Reference is made first to FIG. 1 which shows a network in which embodiments of the present invention can be incorporated. This network is, by way of example a cdma2000 packet data network. It should be appreciated that embodiments of the present invention may be applied to any other network conforming to any other suitable standard. Other standards could for example include other third generation standards but are not limited thereto.

User equipment (mobile node) is provided which may be a mobile station. The user equipment can take any suitable format. For example, the user equipment may be a portable computer, mobile telephone, personal data assistant, organiser or the like.

In this embodiment, the user equipment is a mobile station 2 arranged to communicate with a radio network RN4 via a wireless connection 5. The radio network may comprise, for example, base stations and base station control functions.

The radio network 4 is connected to a packet data serving node (PDSN) 6. The PDSN 6 provides the network access gateway functionality and acts effectively as a router. The PDSN is arranged to communicate with an IP network 8 which may for example be the Internet or the like. The PDSN permits communication from the mobile station and to the mobile station to be routed via the IP network 8.

The PDSN 6 is also connected to an authentication, authorisation and accounting server 10. In the example shown in FIG. 1, the mobile station is not in its home network. Accordingly, the AAA entity 10 to which the PDSN 6 is connected will be that of the visited network. This entity will be referred to as the AAAV 10. The AAAV 10 is also able to communicate with the IP network 8.

The IP network 8 is connected to the authentication authorisation and accounting server 12 in the user's home IP network. This is the AAAH 12.

A second radio access network 14 is shown. This radio access network 14 is in the user's home network 16. The radio access network 14 is connected to a second PDSN 18. The second PDSN 18 is connected to the IP network 8 and the AAAH 12.

Embodiments of the present invention will now be described where the mobile station moves from the first PDSN 6 to the second PDSN 18. Embodiments of the present invention are described in the context where the mobile station is connected to a PDSN in a visited network and moves to a PDSN in the home network. This is by way of example only. The PDSNs may both be in the visited network, both be in the home network or any other two networks.

Figure 2:
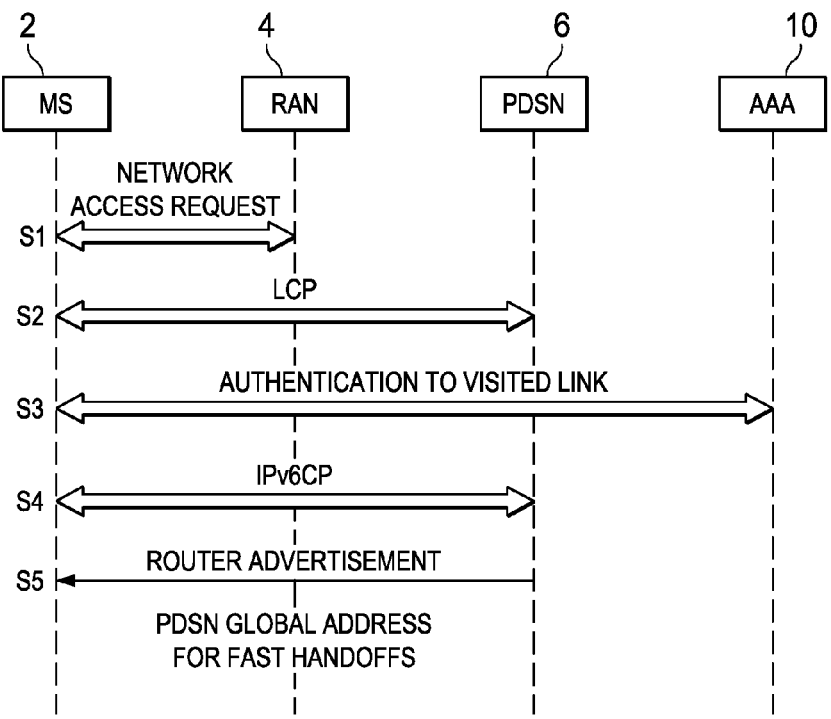
FIG. 2 shows the signalling flow in an embodiment of the present invention.

Reference is now made to FIG. 2 which shows the signalling used in embodiments of the present invention. Shown in FIG. 2 is the mobile station 2, the radio access network 4 to which the mobile station is currently connected and the PDSN 6 to which the mobile station is also currently connected. The AAAV 10 is also shown.

In step S1, a network access request procedure is carried out between the mobile station and the radio access network 4 to which the mobile station is currently attached.

In step S2 a link control protocol phase LCP of the PPP is carried out between the mobile station and the PDSN. LCP is one of the phases in PPP setup. LCP is described in IETF specification RFC 1331. The LCP is used to automatically agree upon the encapsulation format options, handle varying limits on sizes of packets, authenticate the identity of its peer on the link, determine when a link is functioning properly and when it is not, detect a looped-back link and other common configuration errors, and terminate the link. The Link Control Protocol (LCP) is used to establish the connection through an exchange of Configure packets. This exchange is completed, and the LCP Opened state entered, once a Configure-Ack packet has been both sent and received.

In step S3, the AAAV 10 authenticates mobile station.

In step S4 the PDSN configures a virtual interface which is internal to the PDSN. Between the MS and the PDSN, a real PPP link is set up. The PDSN configures a global unicast address on the virtual interface and advertises this address for Fast Handoffs to the Mobile Station on a PPP link.

An IPv6 global address is assigned to the virtual interface. This is to provide support for fast handoff.

In step S5, the PDSN informs the mobile station of this global IPv6 address by including a new option in the router advertisement it sends in step S5 after the PPP set up.

Figure 3:
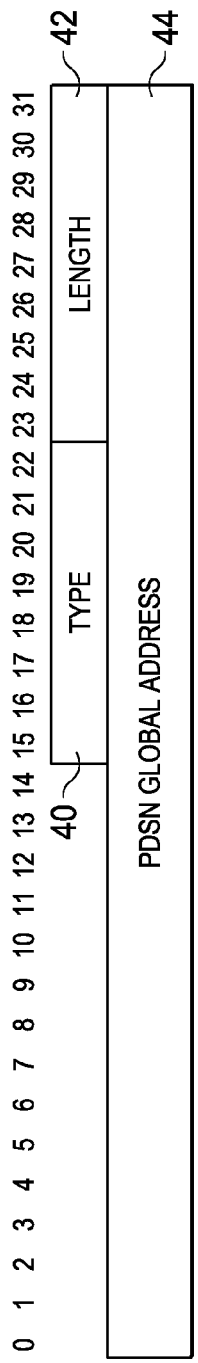
FIG. 3 shows a message for providing a PDSN global address.

The message format for the new message is shown in FIG. 3. The message format comprises a first field 40 which is an 8 bit field indicating the type of the ICMPv6 option. The next field 42 is an 8 bit field indicating the length of the option in units of 8 octets excluding the type and length of fields. It is set to 2 in one embodiment of the invention.

The third field 44 is the PDSN global address field. This is a 16 byte field which contains the IPv6 address of the PDSN for the purpose of fast handoffs.

This message is valid only in a router advertisement. The PDSN includes this option in the router advertisement only if the mobile nodes subscriber profile says that the mobile station is capable of IPv6 fast handoffs and eligible for the fast handoff service. The mobile station profile is downloaded to the PDSN when the mobile station authenticates itself to the PDSN to obtain network access. This may take place in for example step S3

Figure 4:
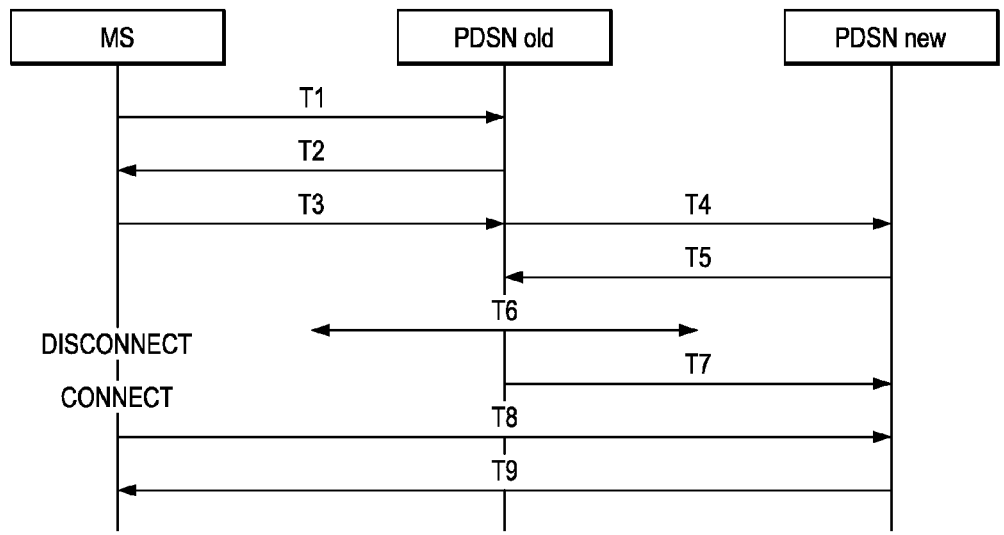
FIG. 4 shows a method of predictive handoff used in embodiments of the invention.
Figure 5:
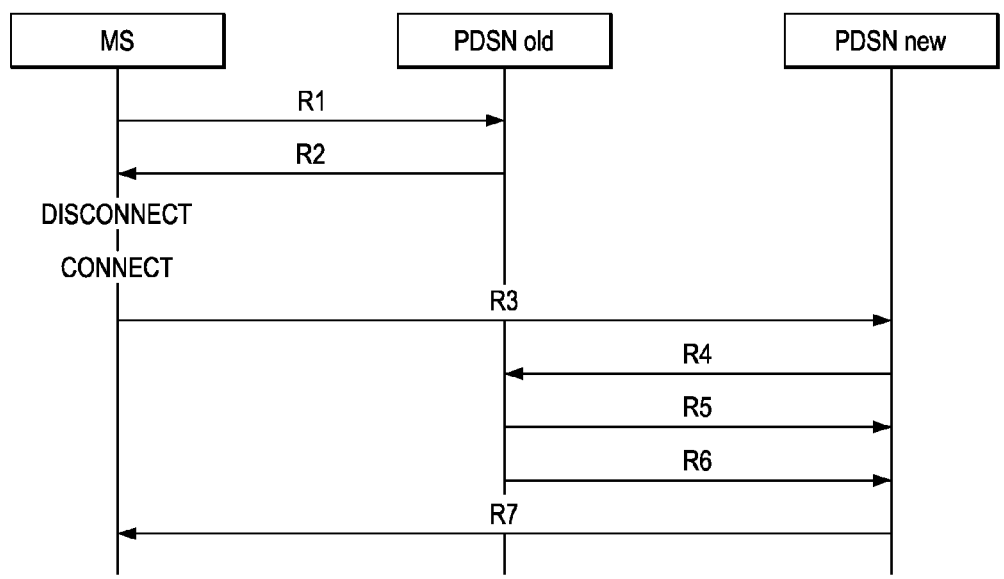
FIG. 5 shows a method of reactive handoff used in embodiments of the invention.

Reference will now be made to FIGS. 4 and 5 which show two examples of handoffs which can occur after step S5 of FIG. 2 when the MS moves to another PDSN.

Reference is made to FIGS. 4 and 5 which show handoff. The steps in FIG. 2 happen when the mobile station attaches to a PDSN. The steps in FIG. 4 or 5 happen when the mobile station hands off from one PDSN to another.

Reference is made to FIG. 4 which shows an example of predictive handoff.

In step T1, the mobile station sends a message to the old PDSN to resolve one or more access point identifiers to subnet specific information.

In step T2, the PDSN sends a Proxy Router advertisement. It contains information about the new link, like for eg. the IPv6 prefix information. The MS can configure a new Care of Address (CoA) before moving to the new link based on the information obtained through the proxy router advertisement.

In step T3 the mobile station send a fast binding update FBU message instruction to the global address of the virtual interface of the old PDSN to redirect its traffic towards the new PDSN. The global address of the PDSN that was obtained by the mobile station in step S5 of FIG. 2 is used as destination address of the FBU message.

In step T4, the old PDSN sends a handoff initiate message to the new PDSN.

In step T5, the handoff message is acknowledged by the new PDSN.

In step T6, a fast binding acknowledgement is sent by the old PDSN towards the mobile station and the new PDSN.

The mobile station disconnects from the old PDSN.

In step T7, the old PDSN forwards packets to the new PDSN.

The mobile station connects to the new PDSN.

In step T8, a fast neighbour advertisement is sent from the mobile station to announce itself to the new PDSN.

In step T9, the new PDSN starts delivering packets to the mobile station.

Sometimes the FBU message sent in the predictive case can get lost. In this case the MS might have to send a FBU after attaching to the new PDSN. The destination address on the FBU message would be old PDSN's global unicast address.

Reference is now made to FIG. 5 which shows an example of reactive handoff.

Steps R1 and R2 are the same steps T1 and T2 of FIG. 4.

The mobile station disconnects from the old PDSN and connects to the new PDSN.

In step R3 a fast neighbour advertisement is sent from the mobile station to announce itself to the new PDSN including a fast binding update. The destination address on the FBU message is set the old PDSN's global unicast address.

In step R4, the new PDSN sends the FBU message in the Fast Neighbor Advertisement (FNA) to the old PDSN.

In step R5, a fast binding acknowledgement is sent from the old PDSN to the new PDSN.

In step R6, packets are forwarded from the old PDSN to the new PDSN.

In step R7, the new PDSN delivers packages to the mobile station.

The PDSN uses the same IPv6 address to support fast handover for all mobile stations that attach to it. The mobile stations send fast binding updates FBU to this address configured on the PDSN.

It should be appreciated that other mechanisms for handoff can be used in embodiments of the present invention.

The mobile station is arranged to process the ICMPv6 option described in FIG. 3 and use the PDSN address for sending the fast binding update. It is arranged so that it does not attempt to send a FBU to the other address if the PDSN includes this ICMPv6 option in the router advertisement.

In embodiments of the present invention, it is possible to implement fast handoffs for IPv6 over cdma2000 networks for inter PDSN handovers. Knowing the global address of the PDSN is important to make this happen.

Even if the PPP link between the mobile station and the PDSN is terminated, the mobile station can send fast binding updates to the PDSN global address. The virtual interface is necessary so that this can be supported. The virtual interface is permanent and does not depend on the MS attaching to the PDSN.

Every communication device needs an interface over which it can communicate with another node. A physical interface is something like an Ethernet interface, WLAN interface, cellular radio link, etc. The software inside the communication device however sees something called a logical interface. A logical interface is associated with a physical interface. A virtual interface is also a logical interface, but is not associated with a physical interface. For example, the PPP link between the Mobile Station and PDSN in cdma2000 networks is a logical interface set up over the radio interface between the PDSN and the Mobile station. A virtual interface on the other hand is not associated with a physical interface on the PDSN. It is internal to the PDSN.

The invention claimed is:

1. A method, comprising:
configuring a virtual interface at a current router used by a user equipment, the virtual interface including a logical interface not associated with a physical interface, the virtual interface established to remain after a handoff from the current router to another router;
configuring a local link to the user equipment, the local link including a point to point protocol link between the current router and the user equipment, the local link being terminated after the handover;
assigning a global address to the virtual interface, the global address identifying the virtual interface at the current router rather than the local link; and
receiving, after the local link between the user equipment and the current router has been terminated and after a care-of-address for the user equipment has been configured, a message sent by the user equipment to the current router using the global address to facilitate the handoff to the another router.

2. A method as claimed in claim 1, wherein the message sent by the user equipment to the current router using the global address is configured to instruct the current router to redirect traffic to the new router in case a redirect message is not received by the current router over the local link before the local link is terminated.

3. A method as claimed in claim 1, wherein the message sent by the user equipment to the current router comprises a fast binding update message.

4. A method as claimed in claim 1, wherein the message sent by the user equipment to the current router comprises is configured to instruct the current router to route packets to a new router.

5. A method as claimed in claim 4, wherein wherein the message sent by the user equipment to the current router comprises a fast binding update message.

6. A method as claimed in claim 1, wherein the global address comprises an internet protocol version six (IPv6) address.

7. A method as claimed in claim 1, further comprising:
sending the global address from the current router to the user equipment over the point to point protocol link between the current router and the user equipment.

8. A method as claimed in claim 7, wherein the sending comprises sending the global address in a router advertisement.

9. A method as claimed in claim 1, wherein the current router comprises a packet data support node.

10. A method as claimed in claim 1, further comprising:
determining when a subscriber profile of the user equipment is eligible for a predetermined handoff service; and
sending the global address to the user equipment when the subscriber profile of the user equipment is eligible for the predetermined handoff service.

11. A method as claimed in claim 10, wherein the predetermined handoff service comprises a fast handoff service.

12. A method comprising:
configuring, at a current router interfacing a mobile station and an internet protocol network, a virtual interface at the current router, the virtual interface comprising a logical interface not associated with a physical interface;

configuring a local link to the mobile station, the local link including a point-to-point protocol link with an address not routable globally, the virtual interface established to support a handoff;

assigning a global address to the virtual interface at the current router, the global address identifying the virtual interface at the current router rather than the local link;

advertising the global address for the handoff of the mobile station from the current router; and receiving, after the local link between the mobile station and the current router has been terminated due to the handoff and after a care-of-address for the mobile station has been configured, a message sent by the mobile station to the current router using the global address at the virtual interface to facilitate the handoff from the current router to another router.

13. The method of claim 12, wherein the message sent by the mobile station to the current router is configured to redirect traffic to the new router in case a redirect message is not received by the current router over the local link before the local link is terminated.

14. An apparatus, comprising:
a virtual interface including a logical interface not associated with a physical address; and
a global address assigned to the virtual interface, the global address identifying the apparatus rather than a local link to a user equipment,
wherein the global address assigned to the virtual interface is configured to facilitate handoff of the user equipment from the apparatus to a new router, and
wherein the apparatus is configured to receive a message sent by the user equipment using the global address after the local link between the apparatus and the user equipment has been terminated and after a care-of-address for the user equipment has been configured.

15. The apparatus of claim 14, wherein the message sent by the user equipment to the global address is configured to instruct the apparatus to redirect traffic to the new router in case a redirect message is not received by the apparatus over the local link before the local ink is terminated.

16. An apparatus, comprising:
one or more processors configured to:
receive a global address from a current router, the global address identifying the current router rather than a local link between the current router and the apparatus; and
send a message to the current router using the global address after the local link between the current router and the apparatus has been terminated and after a care-of-address for the apparatus has been configured,
wherein the global address is assigned to a virtual interface of the current router, the virtual interface including a logical interface not associated with a physical interface, and
wherein the global address is configured to facilitate handoff of the apparatus from the current router to a new router.

17. The router as claimed in claim 16, wherein the message sent from the user equipment to the global address associated with the virtual interface is sent via the new router using the global address.

18. The apparatus of claim 16, wherein the one or more processors are further configured to cause the apparatus to connect with the new router after the local link between the apparatus and the current router is terminated.

19. The apparatus as claimed in claim 16, wherein the message sent to the current router using the global address is configured to instruct the current router to redirect traffic to the new router in case a redirect message is not received over the local link before the local link is terminated.

20. A router, comprising:
a virtual interface comprising a logical interface not associated with a physical interface, the virtual interface having a global address identifying the router rather than a local link between a user equipment and the router; and
one or more processors configured to provide the global address to the user equipment to facilitate a handoff of the user equipment from the router to a new router,
wherein the router is configured to receive a message sent from the user equipment to the global address associated with the virtual interface, the message being received after the local link between the user equipment and the router has been terminated and after a care-of-address for the user equipment has been configured.

21. The router as claimed in claim 20, wherein the global address is provided to the user equipment in a router advertisement sent over the local link between the user equipment and the router.

22. The router as claimed in claim 20, wherein the local link between the user equipment and the router comprises a point-to-point protocol link between the user equipment and the router.

23. The router as claimed in claim 20, wherein the message sent from the user equipment to the global address associated with the virtual interface is configured to instruct the router to redirect traffic to the new router in case a redirect message is not received by the router from the user equipment over the local link before the local link is terminated.

24. The router as claimed in claim 20, wherein the message comprises a fast binding update message.

25. The router as claimed in claim 20, wherein the message is configured to instruct the router to route packets to the user equipment via the new router, the message comprising a fast binding update message.

26. The router as claimed in claim 20, wherein the global address comprises an internet protocol version six (IPv6) address.

27. The router as claimed in claim 20, wherein the one or more processors are further configured send the global address to the user equipment in a router advertisement.

28. The router as claimed in claim 20, wherein the one or more processors are further configured to:
determine when a subscriber profile of the user equipment is eligible for a predetermined handoff service; and
cause the router to send a global address to the user equipment when the subscriber profile of the user equipment is eligible for the predetermined handoff service.

29. A method, comprising:
receiving, at a user equipment, a global address from a current router; and
sending a message from the user equipment to the current router using the global address after a local link between the current router and the user equipment has been terminated and after a care-of-address for the user equipment has been configured,
wherein the global address is assigned to a virtual interface of the current router rather than the local link between the current router and the user equipment, wherein the virtual interface includes a logical interface not associated with a physical interface, and wherein the global address is configured to facilitate handoff of the user equipment from the current router to a new router.

30. The method of claim 29, wherein the message sent by the user equipment to the current router using the global address is configured to instruct the current router to redirect traffic to the new router in case a redirect message is not received by the current router over the local link before the local link is terminated.

\* \* \* \* \*